(12) United States Patent
Nozaki (10) Patent No.: US 7,440,913 B2
(45) Date of Patent: Oct. 21, 2008

(54) COMMODITY ORDER SYSTEM AND COMMODITY ORDER METHOD IN COMMODITY ORDER SYSTEM

(75) Inventor: Takashi Nozaki, Tokyo-to (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 1445 days.

(21) Appl. No.: 09/943,221

(22) Filed: Aug. 29, 2001

(65) Prior Publication Data

US 2002/0026409 A1    Feb. 28, 2002

(30) Foreign Application Priority Data

Aug. 30, 2000    (JP)    ............ P2000-260088

(51) Int. Cl.
*G06Q 40/00*    (2006.01)
(52) U.S. Cl. .............. 705/35; 705/37; 705/38
(58) Field of Classification Search .......... 705/35, 705/36 R, 37, 38
See application file for complete search history.

(56) References Cited

U.S. PATENT DOCUMENTS 6,230,148 B1*    5/2001    Pare et al. .............. 705/40

7,069,234 B1*    6/2006    Cornelius et al. .............. 705/26

FOREIGN PATENT DOCUMENTS

| JP | 11-003387 | 1/1999 |
|----|-----------|--------|
| JP | 11-53444  | 2/1999 |

OTHER PUBLICATIONS

Sackheim, Michael S. "US to Allow Access to Global Electronic Futures Trading". International Financial Law Review. London. May 1999. vol. 18, Issue 5, p. 17.*
Quinn, Jane Bryant. "Database Check Can Avert Fraud". Pittsburgh Post-Gazette. Pittsburgh, PA.: Jan. 1, 1996. p.a. 11.*
"Purchasing the EC Way: Prospects of Huge Savings are Attracting Organizations to Electronic Commerce". Modern Purchasing. Toronto: Oct. 1996. vol. 38, Iss. 10; p. 19.*

* cited by examiner

*Primary Examiner*—Lalita M Hamilton
(74) *Attorney, Agent, or Firm*—Ladas & Parry LLP (57) ABSTRACT

On the occasion of performing the commodity trading on the Internet, the commodity order system is capable of appropriately checking the credit of a buyer, a seller and, further a distributor, so that it is possible to secure the safety and the certainty of the commodity trading for use of the network.

19 Claims, 2 Drawing Sheets

FIG. 1

COMMODITY ORDER SYSTEM AND COMMODITY ORDER METHOD IN COMMODITY ORDER SYSTEM

BACKGROUND OF THE INVENTION

1. Field of the Invention

The present invention relates to a commodity order system capable of putting in an order for a commodity via an Internet from a user terminal.

2. Description of the Related Art

Conventionally, as a system for selling a commodity, for example, a system for selling a commodity by mail order by using a communication device such as an Internet, which is disclosed in Japanese Patent Application Laid-Open No. 11-53444, is known.

According to such a communication system, a seller of a commodity sets up a home page (i.e., a web page) by oneself and provides the information with regard to a commodity, a charge and the like and a procedure for ordering the commodity, paying the charge and the like to a user of the Internet (i.e., a customer). Then, if the ordering procedure is completed, the seller of the commodity will distribute the ordered commodity to a customer via a distributing company.

However, according to such a mail order system, a seller of a commodity does not meet a customer with each other in general, so that it is difficult for the both of the seller and the customer to judge whether they are reliable or not. Accordingly, this has involved many problems such that, for example, a commodity different from one that the customer ordered has been delivered to the customer, the commodity that the customer pay the charge for has not been delivered to the customer and the customer does not pay the charge even he or she receives the commodity.

SUMMARY OF THE INVENTION

The present invention has been made taking the foregoing problem into consideration, an object of the invention is to provide a commodity order system and a commodity order method in this commodity order system capable of trading a commodity in safety and certainly even through a mail order system.

In one aspect of the present invention, a commodity order system is provided with: a user terminal connected to a network; a commodity selling office site connected to the network and is provided with a commodity selling office server; and an electronic check managing site connected to the network and provided with an electronic check managing server and an account information database for accumulating information including account information of a user who uses the user terminal; wherein the user terminal is provided with: a device for having an access to the commodity selling office site via the network and obtaining the information including a charge of a commodity desired by the user; a device for transmitting check issuing demanding information to the electronic check managing server via the network to demand the electronic check managing server to issue the electronic check data corresponding to the obtained charge of the commodity; and a commodity ordering device for transmitting the electronic check data transmitted from the electronic check managing server, and commodity ordering information for ordering a commodity corresponding to the electronic check data to the commodity selling office server site via the network; the electronic check managing server is provided with: a credit judging device for checking the credit of the user who uses the user terminal by referring to the account information database when the electronic check managing server receives the check issuing demanding information transmitted from the user terminal; and a check data transmitting device for creating the electronic check data, of which issuing is demanded, when the credit judging device judges that there is no problem with respect to the credit of the user, and transmitting the electronic check data to the user terminal via the network; the commodity selling office server is provided with: a commodity distribution information transmitting device for transmitting the information indicating that the ordered commodity will be distributed to the user terminal via the network in the case that the distribution information transmitting device receives the electronic check data and the commodity order information transmitted from the user terminal.

According to this aspect, a user has an access to a commodity selling site via a network from a user terminal so that he or she is capable of obtaining the information including the charge of a commodity desired by the user. Then, the information demanding to issue a check is transmitted from the user terminal to a server for managing an electronic check via the network to demand to issue electronic check data in response to the obtained commodity's charge. In the next place, in the case that the server for managing the electronic check receives the information demanding to issue the check transmitted from the user terminal, the server judges the reliability of the user who uses the user terminal by referring to an account information database. Then, if it is judged that there is no problem with respect to the user's reliability, electronic check data demanded to be issued is created so as to be transmitted to the user terminal via the network. In the next place, the electronic check data transmitted from the server for managing the electronic check, and commodity ordering information for putting in an order for the commodity in response to this electronic check data are transmitted from the user terminal to a commodity selling office server via the network. In the case that the commodity selling office server receives the electronic check data and the commodity order information transmitted from the user terminal, the commodity selling server transmits the information indicating that the ordered commodity will be delivered to the user terminal via the network. Thus, a credit check for the user is performed upon putting in an order for the commodity, so that it is possible to trade a commodity in safety and certainly.

In another aspect of the commodity order system of the present invention, the commodity distribution information transmitting device of the commodity selling office server has an access to the electronic check managing site, judges the validity of the electronic check by referring to the account information database and distributes the ordered commodity to the user terminal via the network if the commodity distribution information transmitting device judges that the electronic check is valid.

According to this aspect, upon putting in an order for a commodity, the commodity selling office server also judges the validity of the electronic check data. As a result, the reliability of the user is checked doubly, so that it is possible to further improve the safety and the certainty of the commodity trading.

In further aspect of the commodity order system of the present invention, the electronic check managing site is provided with: a selling office information database for accumulating the information with regard to the commodity selling office site; the check issuing demanding information includes the information with regard to the commodity selling office site; the electronic check managing server is provided with a selling office register judging device for judging whether the information with regard to the commodity selling office site transmitted from the user terminal, is registered in the selling office information database or not in the case that the electronic check managing server receives the check issuing demanding information transmitted from the user terminal; and a check data transmitting device of the electronic check managing server creates the electronic check data, of which issuing is demanded, in the case that the selling office register judging device judges that the information with regard to the commodity selling office site is registered, and transmits the electronic check data to the user terminal via the network.

According to this aspect, the reliability of the selling office is also checked upon putting an order for a commodity, so that it is possible to further improve the safety and the certainty of the commodity trading.

In further aspect of the commodity order system of the present invention, the user terminal is provided with a device for transmitting the information indicating the payment of the charge of the commodity to the commodity selling office server via the network in the case that the user terminal receives the information indicating that the commodity will be distributed, which is transmitted from the commodity selling office server.

According to this aspect, the user terminal transmits the payment of the charge of the commodity after confirming the commodity distribution information.

In further aspect of the commodity order system of the present invention, the commodity selling office server is provided with: a device for transmitting payment demanding information to the electronic check managing server via the network in the case that the commodity distribution information transmitting device transmits the information indicating that the commodity will be distributed to the user terminal; and the electronic check managing server is provided with a device for performing an electronic payment by referring to the account information database and the selling office information database on the basis of the electronic check data in the case that the electronic check managing server receives the payment demanding information transmitted from the commodity selling office server.

According to this aspect, an electronic payment becomes available in a commodity trading via the network.

In further aspect of the commodity order system of the present invention, the electronic check data includes the information of the charge of the commodity and the information with regard to the user terminal.

According to this aspect, the user information is informed by the electronic check data. Therefore, the certainty of the commodity trading is improved.

In further aspect of the commodity order system of the present invention, the commodity selling office server is provided with: a device for transmitting payment demanding information to the electronic check managing server via the network in the case that the commodity distribution information transmitting device transmits the information indicating that the commodity will be distributed to the user terminal; and the electronic check managing server is provided with a device for performing an electronic payment by referring to the account information database and the selling office information database on the basis of the electronic check data in the case that the electronic check managing server receives the payment demanding information transmitted from the commodity selling office server; the payment demanding information includes the information with regard to the electronic check data and the commodity selling office site.

According to this aspect, the safety of the electronic payment is improved.

In further aspect of the commodity order system of the present invention, the commodity ordering device of the user terminal transmits distribution address information showing a distribution address of the commodity to the commodity selling office server together with the electronic check data and the commodity order information via the network.

According to this aspect, in ordering a commodity, a distribution address can be decided.

In further aspect of the commodity order system of the present invention, the commodity selling office server is provided with a device for transmitting the information indicating the distributing instruction of the ordered commodity to the user who uses the user terminal to the distributing server via the network.

According to this aspect, the user can confirm a distributing instruction by the user terminal. Therefore, the certainty of the commodity trading is improved.

In further aspect of the commodity order system of the present invention, the commodity selling office server is provided with: a device for transmitting the information indicating the distributing instruction of the ordered commodity to the user who uses the user terminal to the distributing server via the network, and the electronic check managing site is provided with: a distributing company information database for accumulating the information with regard to the distributing company site; the check issuing demanding information includes the information with regard to the distributing company site; the electronic check managing server is provided with a distributing company register judging device for judging whether the information with regard to the distributing company site transmitted from the user terminal is registered in the distributing company information database or not in the case that the electronic check managing server receives the check issuing demanding information transmitted from the user terminal; and a check data transmitting device of the electronic check managing server creates the electronic check data, of which issuing is demanded, in the case that the distributing company register judging device judges that the information with regard to the distributing company site is registered, and transmits the electronic check data to the user terminal via the network.

According to this aspect, the reliability of the distributing company is also checked upon putting an order for a commodity, so that it is possible to further improve the safety and the certainty of the commodity trading.

In further aspect of the commodity order system of the present invention, the commodity selling office server is provided with a device for transmitting the information indicating the distributing instruction of the ordered commodity to the user who uses the user terminal to the distributing server via the network, the distribution instruction of the commodity includes commodity information corresponding to the commodity order information and distribution address information of the commodity; and the distributing server is provided with a device for determining at least distributing date and time of the commodity on the basis of the commodity information and the distribution address information and instructing the distribution of the commodity.

According to this aspect, distributing date and time of the commodity can be decided automatically. Therefore, the certainty of the commodity trading is improved.

In further aspect of the commodity order system of the present invention, the commodity selling office server is provided with a device for transmitting the information indicating the distributing instruction of the ordered commodity to the user who uses the user terminal to the distributing server via the network, wherein the distributing server is provided with: a device for determining a situation of the distribution of the commodity; and a device for transmitting the information indicating that the distribution of the commodity has been completed to the commodity selling office server via the network in the case that the device for determining the situation of the distribution determines that the distribution of the commodity has been completed.

According to this aspect, it is possible to sequentially get hold of a situation with respect to the distribution of the foregoing commodity.

In further aspect of the present invention, the commodity order method in a commodity order system is provided with: a user terminal connected to a network; a commodity selling office site connected to the network and is provided with a commodity selling office server; and an electronic check managing site connected to the network and is provided with an electronic check managing server and an account information database for accumulating the information including account information of a user who uses the user terminal, the method is provided with the processes of: having an access to the commodity selling office site via the network from the user terminal and obtaining the information including a charge of a commodity desired by the user; transmitting the check issuing demanding information from the user terminal to the electronic check managing server via the network to demand the electronic check managing server to issue the electronic check data corresponding to the obtained charge of the commodity; and checking the credit of the user who uses the user terminal by referring to the account information database in the electronic check managing server when the electronic check managing server receives the check issuing demanding information transmitted from the user terminal; and creating the electronic check data, of which issuing is demanded in the electronic check managing server, when the credit judging process judges that there is no problem with respect to the credit of the user, and transmitting the electronic check data from the electronic check managing server to the user terminal via the network; transmitting the electronic check data transmitted from the electronic check managing server, and commodity ordering information for ordering a commodity corresponding to the electronic check data from the user terminal to the commodity selling office server site via the network; and transmitting the information indicating that the ordered commodity will be distributed from the commodity selling office server to the user terminal via the network.

According to this aspect, the user of the selling office is also checked upon putting an order for a commodity, so that it is possible to further improve the safety and the certainty of the commodity trading.

In further aspect of the commodity order method in the commodity order system of the present invention, the commodity distribution information transmitting process has an access to the electronic check managing site, judges the validity of the electronic check by referring to the account information database and distributes the ordered commodity to the user terminal via the network if the commodity distribution information transmitting process judges that the electronic check is valid.

According to this aspect, upon putting in an order for a commodity, the commodity selling office server also judges the validity of the electronic check data. As a result, the reliability of the user is checked doubly, so that it is possible to further improve the safety and the certainty of the commodity trading.

In further aspect of the commodity order method in the commodity order system of the present invention, the electronic check managing site is provided with: a selling office information database for accumulating the information with regard to the commodity selling office site; the check issuing demanding information includes the information with regard to the commodity selling office site; the electronic check managing server is provided with a selling office register judging process of judging whether the information with regard to the commodity selling office site transmitted from the user terminal is registered in the selling office information database or not; and the check data transmitting process creates the electronic check data, of which issuing is demanded, in the case that the selling office register judging process judges that the information with regard to the commodity selling office site is registered, and transmits the electronic check data to the user terminal via the network.

According to this aspect, the reliability of the selling office is also checked upon putting an order for a commodity, so that it is possible to further improve the safety and the certainty of the commodity trading.

In further aspect of the commodity order method in the commodity order system of the present invention, wherein the commodity order method in a commodity order system is provided with a process of transmitting the information indicating the payment of the charge of the commodity from the user terminal to the commodity selling office server via the network in the case that the user terminal receives the information indicating that the commodity will be distributed, which is transmitted from the commodity selling office server.

According to this aspect, the safety of the commodity trading is improved.

In further aspect of the commodity order method in the commodity order system of the present invention, wherein the commodity order method in a commodity order system is provided with the processes of: transmitting the payment demanding information from the commodity selling office server to the electronic check managing server via the network in the case that the commodity distribution information transmitting process transmits the information indicating that the commodity will be distributed to the user terminal; and performing an electronic payment by referring to the account information database and the selling office information database on the basis of the electronic check data in the electronic check managing server in the case that the electronic check managing server receives the payment demanding information transmitted from the commodity selling office server.

According to this aspect, the certainty of the commodity trading is improved.

In further aspect of the commodity order method in the commodity order system of the present invention, wherein the commodity order process transmits distribution address information showing a distribution address of the commodity to the commodity selling office server together with the electronic check data and the commodity order information via the network.

According to this aspect, the certainty of the commodity trading is improved.

In further aspect of the commodity order method in the commodity Corder system of the present invention, wherein the commodity order system is provided with a distributing company site connected to a network and including a distributing server; wherein the method is provided with a process of transmitting the information indicating the distributing instruction of the ordered commodity to the user who uses the user terminal from the commodity selling office server to the distributing server via the network.

According to this aspect, the certainty of the commodity trading is improved.

In further aspect of the commodity order method in the commodity order system of the present invention, wherein the commodity order system is provided with a distributing company site connected to a network and including a distributing server; wherein the method is provided with a process of transmitting the information indicating the distributing instruction of the ordered commodity to the user who uses the user terminal from the commodity selling office server to the distributing server via the network, wherein the electronic check managing site is provided with a distributing company information database for accumulating the information with regard to the distributing company site; the check issuing demanding information includes the information with regard to the distributing company site; wherein the electronic check managing server is provided with a distributing company register judging process of judging whether the information with regard to the distributing company site transmitted from the user terminal is registered in the distributing company information database or not; and the check data transmitting process creates the electronic check data, of which issuing is demanded, by referring to the account information database in the case that the distributing company register judging process judges that the information with regard to the distributing company site is registered, and transmits the electronic check data to the user terminal via the network.

According to this aspect, the reliability of the distributing company is also checked upon putting an order for a commodity, so that it is possible to further improve the safety and the certainty of the commodity trading.

In further aspect of the commodity order method in the commodity order system of the present invention, wherein the commodity order system is provided with a distributing company site connected to a network and including a distributing server; wherein the method is provided with a process of transmitting the information indicating the distributing instruction of the ordered commodity to the user who uses the user terminal from the commodity selling office server to the distributing server via the network, wherein the information indicating the distribution instruction of the commodity includes commodity information corresponding to the commodity order information and distribution address information of the commodity; and the distributing server is provided with a process of determining at least distributing date and time of the commodity on the basis of the commodity information and the distribution address information and instructing the distribution of the commodity.

According to this aspect, the certainty of the commodity trading is improved.

In further aspect of the commodity order method in the commodity order system of the present invention, wherein the commodity order system is provided with a distributing company site connected to a network and including a distributing server; wherein the method is provided with a process of transmitting the information indicating the distributing instruction of the ordered commodity to the user who uses the user terminal from the commodity selling office server to the distributing server via the network, wherein the distributing server is provided with the processes of: determining a situation of the distribution of the commodity; and transmitting the information indicating that the distribution of the commodity has been completed from the distributing server to the commodity selling office server via the network in the case that the distribution situation determining process determines that the distribution of the commodity has been completed.

According to this aspect, the certainty of the commodity trading is improved.

In further aspect of the commodity order method in the commodity order system of the present invention, wherein the commodity order system is provided with a distributing company site connected to a network and including a distributing server; wherein the method is provided with a process of transmitting the information indicating the distributing instruction of the ordered commodity to the user who uses the user terminal from the commodity selling office server to the distributing server via the network, wherein the distributing server is provided with the processes of: determining a distributing situation of the commodity; transmitting the information indicating that the distribution of the commodity has been completed from the distributing server to the electronic check managing server via the network in the case that it is determined that the distribution of the commodity has been completed by the distributing situation determining process.

According to this aspect, the certainty of the commodity trading is improved.

DESCRIPTION OF THE PREFERRED EMBODIMENTS

Preferred embodiments of the present invention will be explained below with reference to the drawings.

Figure 1:
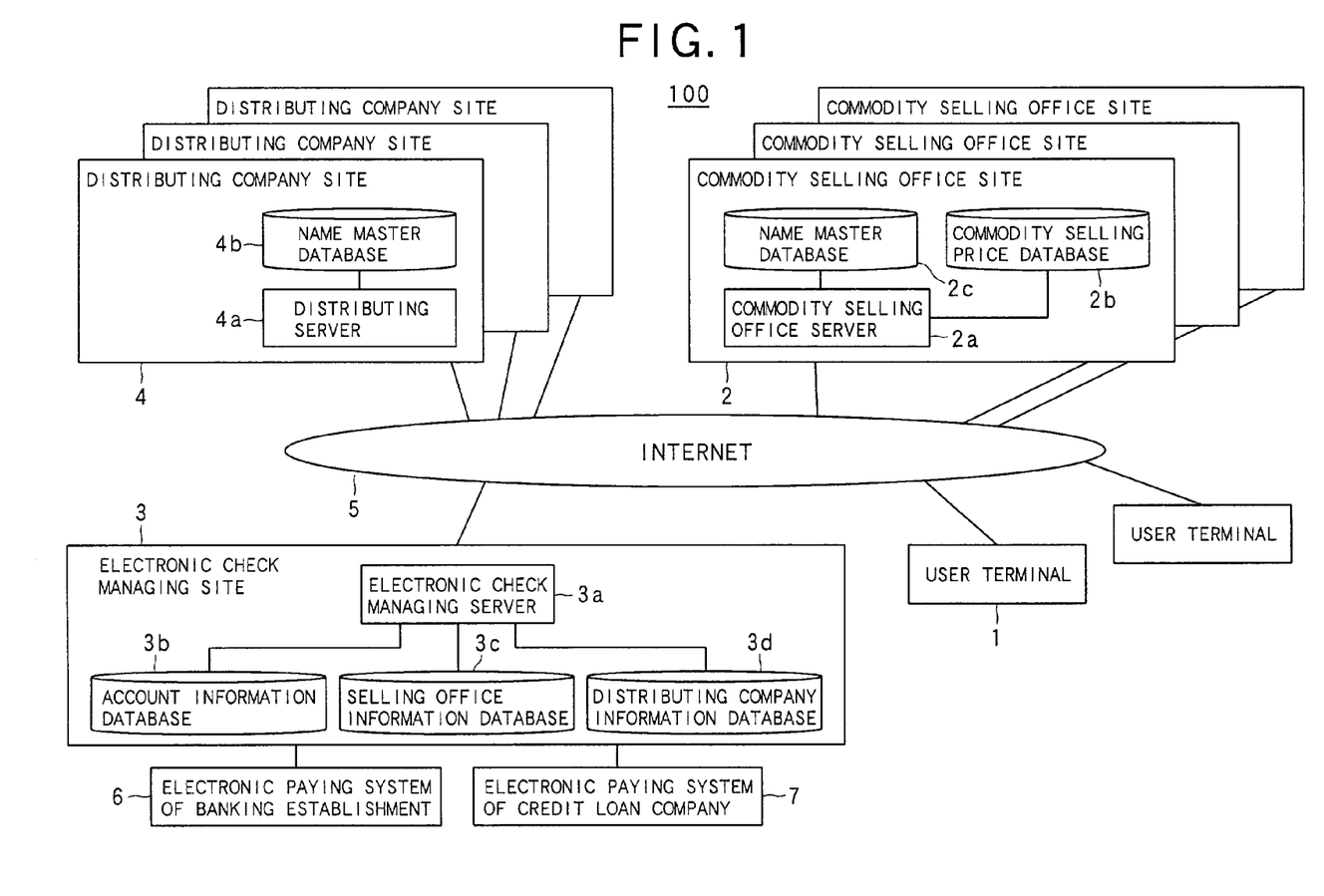
FIG. 1 is a diagram for illustrating a schematic constitution of a commodity order system according to an embodiment of the present invention.

FIG. 1 illustrates a schematic constitution of a commodity order system 100 according to an embodiment of the present invention. As shown in FIG. 1, the commodity order system 100 is roughly configured by a user terminal 1, a commodity selling office site 2, an electronic check managing site 3 and a distributing company site 4. Alternatively, the user terminal 1, the commodity selling office site 2, the electronic check managing site 3 and the distributing company site 4 are connected to a network 5, respectively. The network 5 is a communication device for the use of a public circuit or a dedicated circuit and it may be a wired network or a wireless network. According to the present embodiment, the network 5 is described as an Internet 5. Additionally, as shown in FIG. 1, a plurality of the user terminals 1, a plurality of the commodity selling office sites 2, and a plurality of the distributing company sites 4 are connected to a network 5, respectively.

At first, respective components of the commodity order system 100 according to the present embodiment will be described.

The user terminal 1 is provided with a monitor, a storage device, a key board, a mouse and the like. Further, the user terminal 1 is capable of receiving the service of WWW by using an application program referred to as a WWW (World Wide Web) browser. For example, the user terminal 1 has an access to the commodity selling office site 2 via the Internet 5, so that user terminal 1 is capable of obtaining the commodity information with regard to the mail order in an HTML (Hypertext Markup Language) and displaying its home page on a monitor. This commodity information includes the information such as an appearance of the commodity, a name thereof, a charge thereof, a guarantee period thereof and the like. Alternatively, the user terminal 1 is capable of obtaining a commodity selling office identifying code for identifying the commodity selling office site 2 and a distributing company identifying code for identifying the distributing company site 4 together with the commodity information.

Alternatively, a user who uses the user terminal 1 selects a desired commodity among the commodity information obtained from the commodity selling office site 2, so that the user is capable of making a demand for issuing the electronic check data corresponding to the charge of the commodity on the electronic check managing site 3. On the occasion of such demanding, the user terminal 1 has a function to transmit the information of the commodity's charge and a user terminal identifying code to the electronic check managing site 3 via the Internet 5. Alternatively, on the occasion of such demanding, the user terminal 1 is capable of transmitting the commodity selling office identifying code and the distributing company identifying code. An electronic check managing server 3a described below of the electronic check managing site 3 will transmit the electronic check data to the user terminal 1 which demands to issue the electronic check data after performing a predetermined credit check with respect to this demand. Then, if the user orders a desired commodity, the user terminal 1 will transmit this electronic check data together with the commodity order information to the commodity selling office site 2 via the Internet 5. This commodity order information includes the information such as the commodity code, the number of the commodity and the like. In this case, the user terminal 1 is also capable of transmitting distribution address information for showing an address of distribution of the commodity (for example, an address of the user, a name of the user and the like) to the commodity selling office site 2.

The commodity selling office site 2 is a WWW site, in which the commodity selling office provides a mail order service on the Internet 5 and it is provided with a commodity selling office server 2a, a commodity selling price database 2b and a name master database 2c.

The commodity selling price database 2b associates the information with respect to a commodity code, a name of a commodity, a specification thereof, a charge thereof, a guarantee period thereof, with or without of a business trip, with or without of trade-in, a period of cooling off, the number of sales and the like with each other for every commodity and accumulates (registers) them. The commodity code intends to identify the commodities and it is added for every commodity individually. These information are transmitted to the user terminal 1 via the Internet 5 by the request from the user terminal 1. The name master database 2c associates the information with respect to the commodity selling office identifying code and the name of the commodity selling office or the like with each other to accumulate (register) them.

The commodity selling office server 2a controls the transmission and the reception of various information between the user terminal 1, the electronic check managing site 3 and the distributing company site 4. Specifically, the commodity selling office server 2a has a function to provide the commodity information with respect to the mail order service to the user terminal 1 via the Internet 5. Additionally, the commodity selling office server 2a is also capable of transmitting payment demanding information to the electronic check managing site 3 via the Internet 5 to make a demand for paying the ordered commodity on the electronic check managing site 3. This payment demanding information includes the electronic check data transmitted from the user terminal 1 and the commodity selling office identifying code.

Alternatively, the commodity selling office server 2a has a function to transmit the information for indicating the distribution instruction of the ordered commodity to the user who uses the user terminal 1, to the distributing company site 4 via the Internet 5. This information for showing the distribution instruction includes the information of the ordered commodity and the distribution address information of the ordered commodity. This distribution address information is not needed to be transmitted from the user terminal 1. In other words, the commodity selling office server 2a may be constituted so that the commodity selling office server 2a obtains the distribution address information from an account information database 3b described below of the electronic check managing site 3 on the basis of a user terminal identifying code included in the electronic check data transmitted from the user terminal 1.

The electronic check managing site 3 serves as a backbone of the commodity order system 100 and intends to secure the safety in the commodity trading by using the network. The electronic check managing site 3 is provided with the electronic check managing server 3a, the account information database 3b, a selling office information database 3c and a distributing company information database 3d. Additionally, as shown in FIG. 1, the electronic check managing site 3 is connected to an electronic paying system 6 of a banking establishment and an electronic paying system 7 of a credit loan company via the communication links. The electronic paying system 6 of the banking establishment and the electronic paying system 7 of the credit loan company will pay the charge by the instruction from the electronic check managing site 3.

The account information database 3b associates the information with respect to the user terminal identifying code for identifying the user terminal 1, a name of the user, a sex thereof, an address thereof, a telephone number thereof, a name of his or her trading bank, an account number thereof, an outstanding amount thereof, the information for the user from that bank, a name of his or her trading credit loan company, its credit card number and the information for the user from that credit loan company or the like with each other for every user who makes a contract for using the commodity order system 100 and then, the account information database 3b accumulates (register) them.

The selling office information database 3c associates the information with respect to the commodity selling office identifying code, a name of the selling office, an address of the selling office, a telephone number thereof, a trading bank thereof and an account number thereof or the like with each other for every commodity selling office which makes a contract for using the commodity order system 100 to accumulate (register) them.

The distributing company information database 3d associates the information with respect to the distributing company identifying code, a name of the distributing company, an address of the distributing company, a telephone number thereof, a trading bank thereof and its account number or the like with each other for every distributing company which makes a contract for using the commodity order system 100 to accumulate (register) them.

The electronic check managing server 3a controls the transmission and the reception of various information among the user terminal 1, the selling office site 2 and the distributing company site 4 and performs a credit check of a person who uses the commodity order system 100. Specifically, in the case that the user terminal 1 demands to issue the electronic check, the electronic check managing server 3a has a function to judge the reliability (a credit check) of the user who uses terminal 1 by referring to the account information database 3b. This judgment of the reliability of the user is performed with reference to an outstanding amount of the bank account number registered in the account information database 3b, the information with respect to the user from the bank and the information with respect to the user from the credit loan company. In other words, it is judged whether this user has a capacity to pay the charge or not. Then, the electronic check managing server 3a creates the electronic check data, of which issue is demanded, and transmit this electronic check data to the user terminal 1 via the Internet 5 if it judges that the user has enough capacity to pay the charge. Thus, this electronic check data means a significant meaning for securing the safety in a commodity trading by using the commodity order system 100. Alternatively, this electronic check data includes the information with respect to the charge of the commodity, the user terminal identifying code and the like. However, the electronic check data may include the same information as that of a normal check of a trading bank or the like.

Alternatively, in the case that the commodity selling office identifying code is transmitted from the user terminal 1 together with the demand to issue the electronic check, a condition for creating the electronic check data may be constituted in such a manner it is determined whether this commodity selling office identifying code is registered in the selling office information database 3c or not and the electronic check data may be created when this commodity selling office identifying code is determined to be registered in the selling office information database 3c. Further, in the case that the distributing company identifying code is transmitted from the user terminal 1 together with the demand to issue the electronic check data, a condition for creating the electronic check data may be constituted in such a manner it is determined whether this distributing company identifying code is registered in the distributing company information database 3d or not and the electronic check data may be created when this distributing company identifying code is determined to be registered in the distributing company information database 3d. Thus, not only the credit check of the user is performed, but also the credit check of the selling office and the distributing company is performed. Then, if there is no problem, the electronic check data will be issued.

Alternatively, the electronic check managing server 3a has a function to perform an electronic payment when the commodity selling office server 2a issues the payment demand. For example, the electronic check managing server 3a refers to the account information database 3b and specifies the account number of the user's trading bank from the user terminal identifying code included in the electronic check data. At the same time, referring to the selling office information database 3c, the electronic check managing server 3a specifies the account number of the trading bank of the selling office from the commodity selling office identifying code and instructs the electronic paying system 6 of the banking establishment via the communication links to perform the electronic payment for the charge of the commodity included in the electronic check data. Thus, the charge of the commodity included in the electronic check data is checked off from the account of the user's trading bank, so that this amount of money will be credited to the account of the trading bank of the selling office. This electronic payment may be performed by the electronic paying system 6 of the banking establishment. Alternatively, the electronic check managing server 3a may be connected to the electronic paying system of a post office so that the electronic payment is performed by the electronic paying system of the post office. Alternatively, the function of the electronic check managing site 3 may be constituted so as to be operated in the banking establishment and the credit loan company and it may be incorporated in the paying system of the banking establishment and the electronic paying system 7 of the credit loan company.

The distributing company site 4 is operated by the distributing company on the Internet 5 and it is provided with a distributing server 4a and a name master database 4b.

The name master database 4b associates the distributing company identifying code with a name of the distributing company with each other to accumulate (register) them.

The distributing server 4a controls the transmission and the reception of various information to and from the selling office site 2. Specifically, the distributing server 4a has a function to determine a distribution date and time of the commodity, a distributing vehicle of the commodity, a distributing route of the commodity and the like on the basis of the distribution address information transmitted from the commodity selling office server 2a, and issue the distribution instruction of this commodity.

Figure 2:
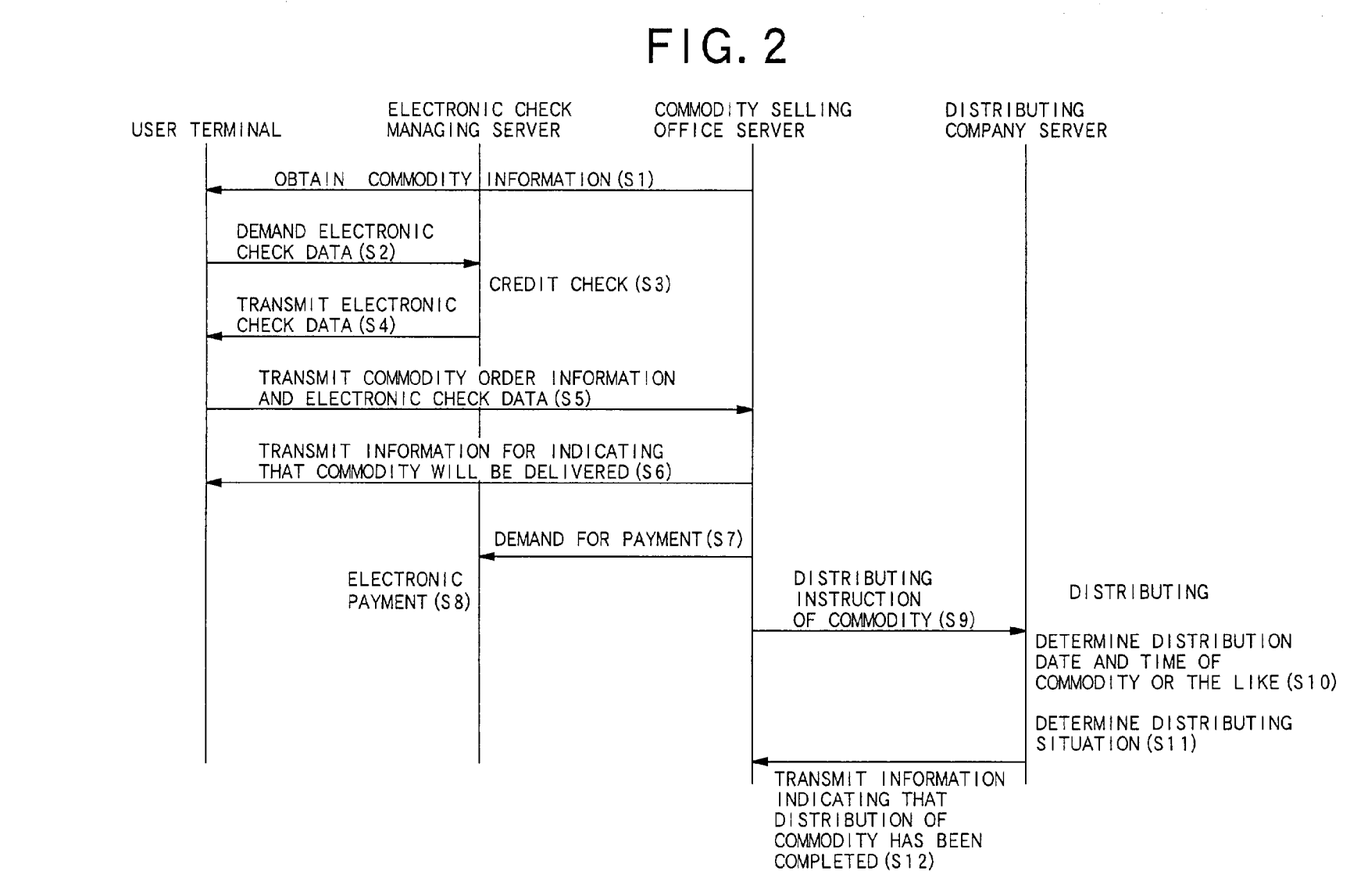
FIG. 2 is a flow chart for showing the operation of the commodity order system according to the embodiment of the present invention.

In the next place, the operation of the commodity order system 100 according to the present embodiment will be described with reference to FIG. 2.

At first, the user terminal 1 has an access to the selling office site 2 via the Internet 5 and obtains the commodity information with respect to the mail order (S1). Thus, the home page of the selling office including the obtained commodity information is displayed on a monitor of the user terminal 1. In the next place, the user selects a desired commodity from the home page displayed on the monitor of the user terminal 1 by using a mouse or the like and makes a demand for the electronic check managing server 3a on issuing the electronic check data corresponding to the charge of this commodity (S2). On the occasion of such a demand, the user terminal 1 transmits the charge information of the commodity selected by the user, and the check issuing demanding information including the user terminal identifying code to the electronic check managing server 3a via the Internet 5. This check issuing demanding information may include the commodity selling office identifying code selected on the home page displayed on the monitor, and the distributing company identifying-code.

In the next place, the electronic check managing server 3a refers to the account information database 3b and performs a credit check (credit judgment) of the corresponding user on the basis of the user terminal identifying code transmitted from the user terminal 1 (S3). Then, in the case that the electronic check managing server 3a judges that there is no problem with respect to the reliability of the user, the electronic check managing server 3a creates the electronic check data, of which issue is demanded, and transmits the corresponding electronic check data to the user terminal 1 (S4). Alternatively, in the step S4, the electronic check managing server 3a may be configured in such a manner it may simply transmit a check ID to the user terminal 1 and then, it may issue the electronic check data on the basis of the check ID. Such a configuration of the electronic check managing server 3a enables the security of the electronic check managing server 3a to be improved.

Alternatively, in the case that the user terminal 1 transmits the commodity selling office identifying code as described above, the electronic check managing server 3a judges whether this commodity selling office identifying code is registered in the selling office information database 3c or not. Then, if it is registered, the electronic check managing server 3a creates the electronic check data. Further, in the case that the user terminal 1 transmits the distributing company identifying code, the electronic check managing server 3a judges whether this distributing company identifying code is registered in the distributing company information database 3d or not. Then, if it is registered, the electronic check managing server 3a creates the electronic check data.

In the next place, the user terminal 1 transmits the electronic check data and the commodity order information for ordering the commodity corresponding to this electronic check data to the commodity selling office server 2a via the Internet 5 (S5). Then, in the case that the commodity selling office server 2a receives the electronic check data and the commodity order information, it transmits the information for indicating that the ordered commodity will be delivered to the user terminal 1 via the Internet 5 (S6).

In this case, if the commodity selling office server 2a receives the electronic check data, the commodity selling office server 2a has an access to the electronic check managing site 3 and judges the validity of this electronic check data by referring to the information database 3b. Then, if it is judged that this electronic check data has the validity, the processing will shift to step S6. In the other words, the commodity selling office server 2a may be constituted in such a manner that, associating the information with respect to the user included in the foregoing electronic check data with the information included in the information database 3b, the corresponding commodity is allowed to be sold in the only case that they correspond to each other. Such constitution of the commodity selling office server 2a enables the credit judgment of the electronic check managing server 3a and the validity judgment of the commodity selling office server 2a to be doubly checked, so that it is possible to further improve the safety in the corresponding commodity trading.

Additionally, the commodity selling office server 2a makes a demand for payment of the charge of the corresponding commodity on the electronic check managing server 3a (S7). On the occasion of such a demand, the commodity selling office server 2a transmits the payment demanding information including the electronic check data and the commodity selling office identifying code to the electronic check managing server 3a via the Internet 5. Then, as described above, the electronic check managing server 3a refers to the account information database 3b and the selling office information database 3c and it performs the electronic payment on the basis of the electronic check data (S8).

Additionally, the commodity selling office server 2a transmits the information for indicating the distributing instruction of the commodity to the user who uses the user terminal 1, to the distributing server 4a via the Internet 5 (S9). This information indicating the distributing instruction includes the commodity information corresponding to the commodity order information and the distribution address information of the corresponding commodity. Alternatively, in the step S9, in spite of transmitting the information indicating the distributing instruction of the commodity from the commodity selling office server 2a to the distributing server 4a, the commodity selling office may transmit a covering letter made of paper to the distributing company in order to instruct the distributing company to distribute the commodity.

In the next place, the distributing server 4a determines a distribution date and time of the commodity, a distributing vehicle of the commodity, a distributing route of the commodity and the like on the basis of the commodity information and the distribution address information (S10). Further, the foregoing commodity is distributed to the user who used the user terminal 1 by the distributing vehicle under the instruction by the distributing server 4a. Alternatively, a PDS (Personal Digital Assistants) terminal and a GPS (Global Positioning System) are loaded in the vehicle for distributing the commodity, so that a coordinate position (a latitude, a longitude) of the vehicle while moving is detected. The detected coordinate position is transmitted to the distributing server 4a via a wireless communication. The distributing server 4a receives the transmitted position information to determine the distributing situation on the basis of this information (S11). Then, if the distributing server 4a determines that the distribution of the commodity has been completed, namely, if the distributing vehicle arrives at the address of the user who uses the user terminal 1, the distributing server 4a transmits the information indicating that the distribution of the commodity has been completed to the commodity selling office server 2a via the Internet 5 (S12). Thus, the commodity selling office server 2a recognizes that the ordered commodity has been reached the user in fact. Alternatively, in the step S12, after the distributor who is getting on a vehicle handed over the commodity to the user in fact, the information indicating that the commodity has been distributed to the user may be transmitted to the distributing server 4a. After the distributing server 4a received such information, the distributing server 4a may transmit the information indicating that the distribution of the commodity has been completed to the commodity selling office server 2a via the Internet 5.

Thus, on the occasion of performing the commodity trading on the Internet 5, the commodity order system 100 is capable of appropriately checking the credit of a buyer, a seller and, further, a distributor, so that it is possible to secure the safety and the certainty of the commodity trading.

Alternatively, in place of the above steps S7 and S8, the following steps may be provided. In other words, in the case that the user terminal 1 receives the information indicating that the commodity will be distributed, which is transmitted form the commodity selling office server 2a, the user terminal 1 will transmit the information indicating the payment of the charge of the corresponding commodity to the commodity selling office server 2a via the foregoing network. This information indicating the payment of the charge of the corresponding commodity includes a method for paying the charge designated by the user, for example, a paying method such as payment by card, bank transfer, cash on delivery and the like. Additionally, the information indicating the payment of the charge of the commodity may include an electronic payment, so that the charge will be paid by transmitting this information indicating the payment of the charge of the commodity from the commodity selling office server 2a. Alternatively, the electronic check data may be printed by the instruction from the electronic check managing server 3a to treat the electronic check as a normal check, so that the selling office may accept the charge from the bank.

Alternatively, without providing the above steps S7 and S8, after the distributing server 4a transmitted the information indicating that the distribution of the commodity has been completed to the commodity selling office server 2a via the Internet 5, the commodity selling office server 2a may demand the user terminal 1 to pay the charge of the commodity in step S12.

Alternatively, the processing in the above step S7 may be constituted so as to be performed after the step S9 or the step S12. Such a constitution enables the protection for the user to be reinforced in the case that the commodity selling office site 2 is operated by an individual or a conformation, which approximates an individual.

Alternatively, in the step S12, the distributing server 4a may be constituted so as to transmit the information indicating that the distribution of the commodity has been completed to the electronic check managing server 3a via the Internet 5. Such a constitution enables the protection for the user to be reinforced in the case that the commodity selling office site 2 is operated by an individual or a conformation, which approximates an individual.

Alternatively, the present invention can be applied even in the case that the reliability of both of the seller and the buyer is low such as the trading between individuals, so that it is possible to secure the safety and the certainty of the commodity trading. Additionally, the electronic check managing server 3a, the user terminal 1 and the commodity selling office server 2a may be connected by a dedicated circuit as a network.

As described above, according to the present invention, on the occasion of performing the commodity trading on the Internet, the commodity order system is capable of appropriately checking the credit of a buyer, a seller and, further, a distributor, so that it is possible to secure the safety and the certainty of the commodity trading for the use of the network.

The entire disclosure of Japanese Patent Application No. 2000-260088 filed on Aug. 30, 2000 including the specification, claims, drawings and summary is incorporated herein by reference in its entirety.

What is claimed is:

1. A commodity order system comprising:
   a user terminal connected to a network;
   a commodity selling office site connected to the network and comprising a commodity selling office server; and
   an electronic check managing site connected to the network and comprising an electronic check managing server and an account information database for accumulating information including account information of a user who uses the user terminal;
   wherein the user terminal comprising:
   means for accessing the commodity selling office site via the network and obtaining information including a selling price of a commodity desired by the user;
   means for transmitting check issuing demanding information to the electronic check managing server via the network to demand that the electronic check managing server issue electronic check data corresponding to the selling price of the commodity desired by the user; and
   commodity ordering means for transmitting the electronic check data transmitted from the electronic check managing server, and commodity ordering information for ordering a commodity corresponding to the electronic check data to the commodity selling office server site via the network;
   the electronic check managing server comprising:
   credit judging means for checking the credit of the user who uses the user terminal by referring to the account information database when the electronic check managing server receives the check issuing demanding information transmitted from the user terminal;
   the commodity selling office server comprising:
   commodity distribution information transmitting means for transmitting ordered commodity information to the user terminal via the network, the ordered commodity information indicating that the ordered commodity will be distributed in the event that the commodity selling office server receives both the electronic check data and the commodity order information transmitted from the user terminal,
   wherein the commodity distribution information transmitting means has access to the electronic check managing site, judges the validity of the electronic check data by referring to a selling office information database and distributes the ordered commodity information to the user terminal via the network if the commodity distribution information transmitting means judges that the electronic check data is valid;
   wherein:
   the selling office information database accumulates information with regard to the commodity selling office site;
   the check issuing demanding information includes information with regard to the commodity selling office site;
   the electronic check managing server comprises a selling office credit judging means for judging whether the credit information with regard to the commodity selling office site transmitted from the user terminal, is stored in the selling office information database or not in the case that the electronic check managing server receives the check issuing demanding information transmitted from the user terminal;
   the electronic check managing site comprises a distributing company information database for accumulating the information with regard to the distributing company site;
   the check issuing demanding information includes the information with regard to the distributing company site;
   the electronic check managing server comprises a distributing company credit judging means for judging whether the credit information with regard to the distributing company site transmitted from the user terminal is stored in the distributing company information database or not in the case that the electronic check managing server receives the check issuing demanding information transmitted from the user terminal;
   a check data transmitting means of the electronic check managing server creates the electronic check data, of which issuance is demanded, in the event that the credit judging device judges that there is no problem with respect to the credit of the user, the selling office register judging means judges that the information with regard to the commodity selling office site is registered therewith, and the distributing company register judging device judges that the information with regard to the distributing company site is registered, after these judging process, transmits the electronic check data.

2. The commodity order system according to claim 1, wherein the user terminal comprises means for transmitting information indicating payment of the selling price of the commodity to the commodity selling office server via the network in the event that the user terminal receives information indicating that the commodity will be distributed from the commodity selling office server.

3. The commodity order system according to claim 1, wherein
   the commodity selling office server comprises means for transmitting payment demanding information to the electronic check managing server via the network in the event that the commodity distribution information transmitting means transmits information to the user terminal indicating that the commodity will be distributed; and
   the electronic check managing server comprises means for performing an electronic payment by referring to the account information database and the selling office information database on the basis of the electronic check data in the event that the electronic check managing server receives the payment demanding information transmitted from the commodity selling office server.

4. The commodity order system according to claim 1, wherein
   the electronic check data includes information regarding the selling price of the commodity and information with regard to the user terminal.

5. The commodity order system according to claim 3, wherein
the payment demanding information includes the information with regard to the electronic check data and the commodity selling office site.

6. The commodity order system according to claim 1, wherein
the commodity order means of the user terminal transmits distribution address information showing a distribution address of the commodity to the commodity selling office server together with the electronic check data and the commodity order information via the network.

7. The commodity order system according to claim 1, comprising a distributing company site connected to a network and including a distributing server;
wherein the commodity selling office server comprises means for transmitting the information indicating the distributing instruction of the ordered commodity to the user who uses the user terminal to the distributing server via the network.

8. The commodity order system according to claim 7, wherein the commodity distribution information transmitting means of the commodity selling office server has access to the electronic check managing site, further judges the validity of the electronic check data by referring to the distributing company information database and distributes information regarding the ordered commodity to the user terminal via the network if the commodity distribution information transmitting device judges that the electronic check data is valid.

9. The commodity order system according to claim 7, wherein
the information indicating the distribution instruction of the commodity includes commodity information corresponding to the commodity order information and distribution address information of the commodity; and
the distributing server comprises means for determining at least distributing date and time of the commodity on the basis of the commodity information and the distribution address information and instructing the distribution of the commodity.

10. The commodity order system according to claim 7, wherein the distributing server comprises:
means for determining a situation of the distribution of the commodity; and
means for transmitting the information indicating that the distribution of the commodity has been completed to the commodity selling office server via the network in the case that the means for determining the situation of the distribution determines that the distribution of the commodity has been completed.

11. A commodity order method, the method comprising:
accessing commodity selling office site via network from user terminal and obtaining information including a charge of a commodity desired by the user;
transmitting check issuing demanding information from the user terminal to electronic check managing server via the network to demand electronic check managing server to issue electronic check data corresponding to the obtained charge of commodity; and
checking the credit of the user who uses the user terminal by referring to account information database in the electronic check managing server when the electronic check managing server receives the check issuing demanding information transmitted from the user terminal;
transmitting the electronic check data transmitted from the electronic check managing server, and commodity ordering information for ordering a commodity corresponding to the electronic check data from the user terminal to commodity selling office server site via the network;
transmitting the information to the user terminal via the network, the information indicating that the ordered commodity will be distributed,
wherein the commodity distribution information transmitting process is configured to access the electronic check managing site, is configured to judge the validity of the electronic check data by referring to a selling office information database and is configured to distribute the ordered commodity information to the user terminal via the network if the commodity distribution information transmitting process judges that the electronic check data is valid;
wherein:
the electronic check managing site comprises a selling office information database for accumulating the information with regard to the commodity selling office site;
the check issuing demanding information includes the information with regard to the commodity selling office site;
the electronic check managing server comprises a selling office credit judging process for judging whether the credit information with regard to the commodity selling office site transmitted from the user terminal is stored in the selling office information database or not;
the electronic check managing site comprises a distributing company information database for accumulating the information with regard to the distributing company site;
the check issuing demanding information includes the information with regard to the distributing company site;
the electronic check managing server comprises a distributing company credit judging process for judging whether the credit information with regard to the distributing company site transmitted from the user terminal is stored in the distributing company information database or not;
the check data transmitting process creates the electronic check data, of which issuing is demanded, in the case that the credit judging device judges that there is no problem with respect to the credit of the user, the selling office register judging process judges that the information with regard to the commodity selling office site is registered, and the distributing company register judging device judges that the information with regard to the distributing company site is registered, after these judging processes, transmits the electronic check data.

12. The commodity order method according to claim 11 further comprising transmitting the information indicating the payment of the charge of the commodity from the user terminal to the commodity selling office server via the network in the case that the user terminal receives the information indicating that the commodity will be distributed, which is transmitted from the commodity selling office server.

13. The commodity order method according to claim 11 further comprising:
transmitting the payment demanding information from the commodity selling office server to the electronic check managing server via the network in the case that the commodity distribution information transmitting process transmits the information indicating that the commodity will be distributed to the user terminal; and
performing an electronic payment by referring to the account information database and the selling office information database on the basis of the electronic check data in the electronic check managing server in the case that the electronic check managing server receives the payment demanding information transmitted from the commodity selling office server.

14. The commodity order method according to claim 11, wherein
the commodity order process transmits distribution address information showing a distribution address of the commodity to the commodity selling office server together with the electronic check data and the commodity order information via the network.

15. The commodity order method according to claim 11, further comprising
transmitting the information indicating the distributing instruction of the ordered commodity to the user who uses the user terminal from the commodity selling office server to distributing server via the network.

16. The commodity order method according to claim 15, wherein:
transmitting the information further includes accessing the electronic check managing site, judging the validity of the electronic check data by referring to a distributing company information database and distributing the ordered commodity to the user terminal via the network if the commodity distribution information transmitting process judges that the electronic check data is valid.

17. The commodity order method according to claim 15, further comprising:
providing commodity information corresponding to the commodity order information and distribution address information of the commodity in the information indicating the distribution instruction of the commodity; and
determining at least distributing date and time of the commodity on the basis of the commodity information and the distribution address information and instructing the distribution of the commodity.

18. The commodity order method according to claim 15, wherein further comprising:
determining a situation of the distribution of the commodity; and
transmitting the information indicating that the distribution of the commodity has been completed from the distributing server to the commodity selling office server via the network in the case that the distribution situation determining process determines that the distribution of the commodity has been completed.

19. The commodity order method according to claim 15, wherein further comprising:
determining a distributing situation of the commodity;
transmitting the information indicating that the distribution of the commodity has been completed, from the distributing server to the electronic check managing server via the network in the case that it is determined that the distribution of the commodity has been completed by the distributing situation determining process.

* * * * *